United States Patent
Mirashrafi et al.

(10) Patent No.: US 9,705,913 B2
(45) Date of Patent: Jul. 11, 2017

(54) WIRELESS HOTSPOT ATTACK DETECTION

(71) Applicant: Intel Corporation, Santa Clara, CA (US)

(72) Inventors: Mojtaba Mojy Mirashrafi, Portland, OR (US); Jason M. Fung, Portland, OR (US); Jiphun Satapathy, Portland, OR (US); Sachin B. Godse, Portland, OR (US); Mrudula Yelamanchi, Portland, OR (US); Dave Paul Singh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 14/927,128

(22) Filed: Oct. 29, 2015

(65) Prior Publication Data

US 2017/0126705 A1    May 4, 2017

(51) Int. Cl.
  *H04L 9/00*   (2006.01)
  *H04L 29/06*  (2006.01)
  *H04W 12/10*  (2009.01)
  *H04W 76/02*  (2009.01)
  *G06N 99/00*  (2010.01)
  *H04W 84/12*  (2009.01)

(52) U.S. Cl.
  CPC ......... *H04L 63/145* (2013.01); *G06N 99/005* (2013.01); *H04L 63/0876* (2013.01); *H04L 63/102* (2013.01); *H04W 12/10* (2013.01); *H04W 76/021* (2013.01); *H04W 84/12* (2013.01)

(58) Field of Classification Search
  CPC .... H04L 63/102; H04L 63/145; H04W 12/10; H04W 84/12; H04W 76/021; G06N 99/005
  See application file for complete search history.

(56) References Cited

U.S. PATENT DOCUMENTS

| | | | | |
|---|---|---|---|---|
| 7,733,804 B2* | 6/2010 | Hardjono | ............ | H04L 63/0823 370/254 |
| 8,799,993 B1* | 8/2014 | Efrati | ............ | H04L 63/205 709/225 |
| 2011/0179477 A1* | 7/2011 | Starnes | ............ | G06F 21/52 726/9 |
| 2013/0097710 A1* | 4/2013 | Basavapatna | ............ | H04W 4/02 726/25 |
| 2014/0282860 A1* | 9/2014 | Efrati | ............ | H04W 12/08 726/1 |

* cited by examiner

*Primary Examiner* — Beemnet Dada
(74) *Attorney, Agent, or Firm* — Schwegman Lundberg & Woessner, P.A.

(57) ABSTRACT

Disclosed in some examples are methods, systems, and machine readable mediums which provide a security rating to an STA for a WLAN AP. Prior to connecting to an AP, the STA employs pre-connection logic in the STA to identify likely safe and likely unsafe APs. Once the user connects to an AP, the STA connects first in an untrusted mode. In the untrusted mode, the STA uses the network connectivity provided by the AP to establish a secure connection to a network-based WLAN trust service for post-connection security checks. If the AP passes the post-connection security checks, the STA may allow other applications to access the network connection provided by the AP.

20 Claims, 5 Drawing Sheets

WIRELESS HOTSPOT ATTACK DETECTION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, Corp., All Rights Reserved.

TECHNICAL FIELD

Embodiments pertain to wireless local area networks (WLANs). Some embodiments relate to preventing electronic attacks and eavesdropping of users of WLANs.

BACKGROUND

WLAN networks typically feature wireless access points (AP) which provide "hotspots," to mobile devices (called wireless stations (STA)). These hotspots provide connectivity and services to the STA. For example, a hotspot may provide the STA with access to the Internet. In order to advertise the availability of the hotspot, the APs broadcast a Service Set Identifier (SSID). When the STA wishes to connect to a network (e.g., for accessing the Internet), the STA scans for SSIDs of hotspots in range. In some cases, the STA connects automatically to a hotspot if so configured. In other cases, the STA allows users to select from among the available hotspots in the area by presenting the user with a list of the SSIDs received by the STA.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
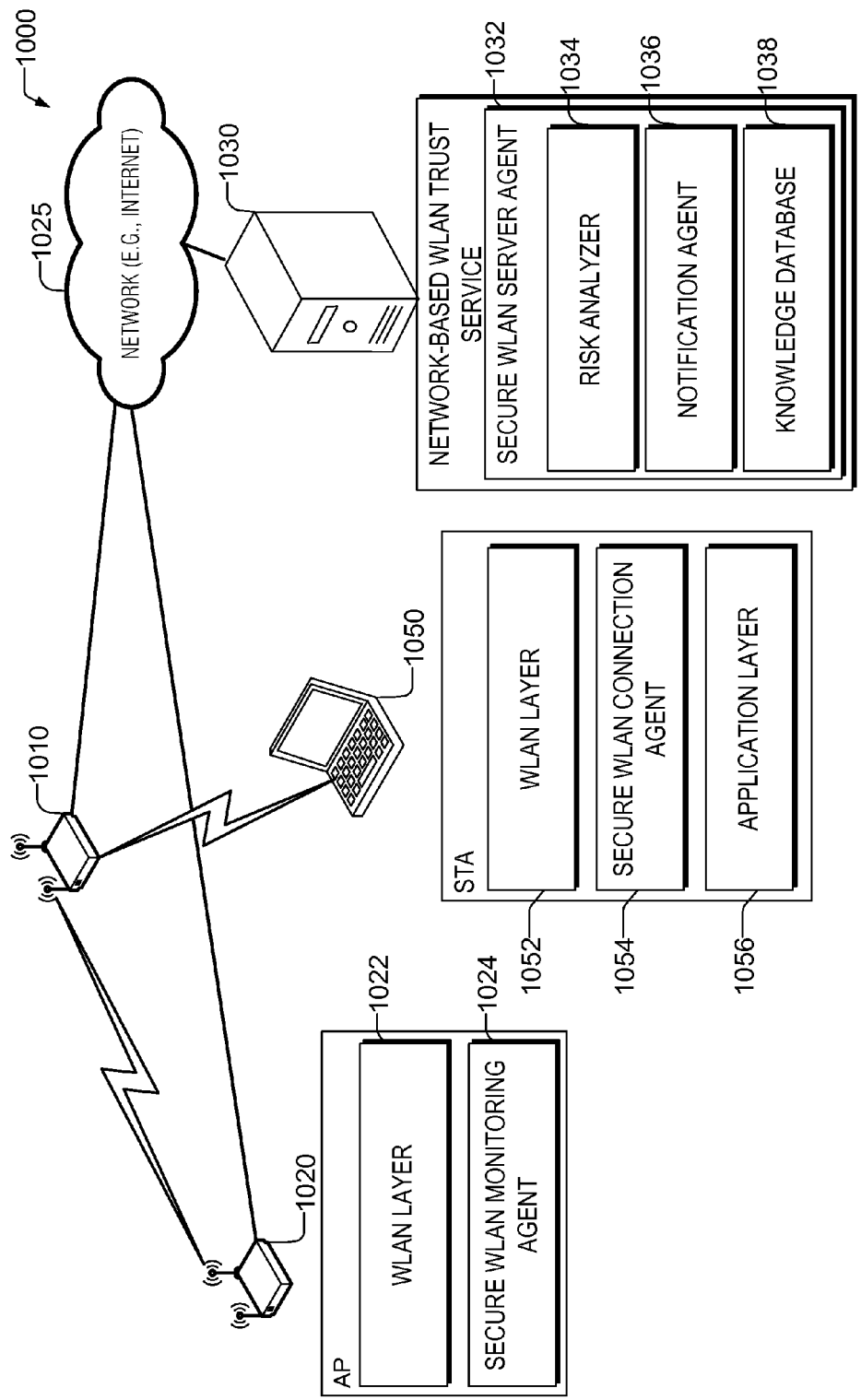
FIG. 1 shows a schematic of a wireless environment according to some examples of the present disclosure.

When a STA connects to a hotspot, the STA has no way of knowing whether the AP providing the hotspot is legitimate and secure. Users may unknowingly connect to an unsecure or illegitimate hotspot. Unsecure or illegitimate hotspots expose user data to snooping and may allow for identity theft.

For example, the 802.11 standard promulgated by the Institute for Electrical and Electronics Engineers (IEEE) does not provide for any way to ensure that the AP is a legitimate access point and that it is legitimately using the SSID. As a result, it is a common tactic for attackers to steal user's personal information by setting up a rogue AP that duplicates a legitimate AP's SSID. For example, a local coffee shop may advertise free WLAN hotspots. Nothing prevents a malicious third party from setting up their own hotspot with an SSID identical to that of the coffee shop. Unencrypted data sent by users connected to this imposter network is then susceptible to monitoring by the individuals who setup the imposter network. This tactic has become very successful, in part because the user is often unaware that they connected to an imposter.

In other examples, the AP itself may be legitimate but it may not be properly configured and thus may be susceptible to eavesdropping or other attacks, or may have been compromised and in control of a nefarious third party. While the wireless network connection agent in most operating systems provides a lock icon to inform users whether or not the AP requires authentication, this check is superficial and ignores many important factors such as the robustness of the connection protocol.

Other example attacks include Address Resolution Protocol (ARP) spoofing in which an attacker's MAC address is associated with the IP address of a legitimate user; Session Hijacking whereby a session ID is not encrypted and an attacker intercepts and uses that session id to impersonate a legitimate user on a target website; Evil Twin attacks whereby the attacker sends a deauthentication message to a Wi-Fi access point to deauthenticate the legitimate user and has them connect to a Wi-Fi access point they control (same SSID); Man in the Middle Attacks; and the like. These are but a few example of a number of scenarios in which the STA has no indication that they are connecting to an AP that is compromised or susceptible to being compromised.

Disclosed in some examples are methods, systems, and machine-readable mediums which provide a security rating to a STA for a WLAN AP. Prior to connecting to an AP, the STA employs pre-connection logic in the STA to identify likely safe and likely unsafe APs. These ratings may be communicated to the user of the STA. Once the user connects to an AP, the STA connects first in an untrusted mode. In the untrusted mode, the STA may perform additional checks on the AP using information about the AP not available until after the STA connects to the AP. Additionally the STA uses the network connectivity provided by the AP to establish a secure connection to a network-based WLAN trust service to obtain a refined trust rating. The refined trust rating is calculated by the network-based WLAN trust service based upon information sent by the STA, other STAs that have or are connected to the AP, from other APs that are neighbors to the AP, service providers (e.g., a whitelist of SSIDs and their MAC addresses at various hotspot locations), and public information maintained by the government and companies (e.g., white lists of known, good top level DNS). During the untrusted mode, the only application allowed to access the network is a security application on the STA and only for the purposes of contacting the network-based WLAN trust service. All other connections are blocked. If the refined trust rating of the AP is above a predetermined threshold, or is satisfactory to the user, the STA may allow other applications to access the network connection provided by the AP.

Once the applications are allowed to connect, the STA may continue to periodically monitor the security of the AP in conjunction with the network-based WLAN trust service. Changes in the security rating of the AP after the untrusted mode has ended may cause the STA to take actions such as notification to the user, disconnection from the AP completely, terminating the network connection to applications that transmit personal information (e.g., based upon a predetermined list), and the like. The WLAN trust service, which assists the STAs in assessing the trustworthiness of APs, receives information about APs from a number of STAs, and in some examples, other APs nearby, and uses that information to notify STAs and other interested parties about potentially unsafe APs.

Turning now to FIG. 1, a schematic of a wireless environment 1000 is shown according to some examples of the present disclosure. Access Points 1010 and 1020 provide hotspots allowing wireless connectivity to network 1025 for STAs (e.g., STA 1050). AP 1010 and 1020 may be connected to network 1025. Network-based WLAN trust service 1030 is reachable over network 1025 from APs 1010 and 1020 and may be reachable by STAs connected to APs 1010 and 1020. WLAN trust service 1030 may be provided by one or more network-based servers.

STAs such as STA 1050 may comprise a WLAN layer 1052, a Secure WLAN Connection Agent (SWCA) 1054, an Application Layer 1056, and the like. STA 1050 may have additional layers not illustrated in FIG. 1, and the layers in FIG. 1 are merely exemplary and the STA may be organized in other manners without deviating from the scope of this disclosure. Prior to connecting to an access point, such as AP 1010, the WLAN Layer 1052 of the STA 1050 (shown as a mobile device such as a laptop computer) may scan for available access points that it can connect with. In FIG. 1, this is for example AP 1010 and AP 1020.

WLAN layer 1052 may implement the various protocols used to scan for SSIDs broadcast by APs to determine available APs, connect to APs, authenticate with APs, exchange packets with APs, and the like. For example, the WLAN layer 1052 may implement the Physical (PHY), Medium Access Control (MAC), and Logical Link Control (LLC) layers of the 802.11 specification. STA 1050 may also include an application layer 1056 which may send and receive data over the WLAN. Applications in the application layer 1056 may include email applications, web-browsing applications, text messaging applications, voice applications, data applications, streaming applications, video applications, social networking applications, audio applications, and other end-user applications. Applications may also include enterprise applications such as corporate email, corporate virtual private networking, and the like. Application layer 1056 may also include applications allowing users to select one or more APs to connect to. In some examples, this selection functionality may be considered part of the operating system of STA 1050 (not shown) or part of WLAN layer 1052. In other examples, this selection functionality may be part of the Secure WLAN Connection Agent (SWCA) 1054. For purposes of the discussion herein, this selection functionality is included in the application layer 1056.

STA 1050 also includes a Secure WLAN Connection Agent (SWCA) 1054. Prior to a connection, SWCA 1054 of STA 1050 performs a number of pre-connection checks on APs 1010 and 1020 and any other APs which are in range of the STA 1050 to produce an initial trust score that provides an assessment of the trustworthiness of a given AP. SWCA 1054 obtains information about APs which were found when the WLAN layer 1052 scanned for available APs (e.g., AP 1010). This information includes one or more of: the SSID, the MAC address, the make and model of the AP, security protocols used (e.g., WEP, WPA2, AES, TKIP, and the like), a received signal strength, and the like. The SWCA 1054 then assesses a trustworthiness of each AP based upon this information.

For example, the SWCA 1054 may utilize various security indicators, such as:
  Whether the make and model of the AP is consistent with the usual equipment used by the service provider.
    This may be determined based upon BSSID which may be the MAC address of the AP. The first three octets of the MAC address may identify the manufacturer of the network interface used by the AP. The mapping between the first three octets and the manufacturer is public information that may be stored at the STA prior to connecting to an AP. For example, if the MAC address does not decode to a known manufacturer, it is likely the AP is a rogue. Also, if there are four different MAC addresses broadcasting the same SSID, and three are similar (e.g., matching the first three octets to indicate that the same manufacturer made the AP) and one is not, it is possible that the MAC address that is not similar is a rogue.
  Whether the security configuration for the AP is consistent with the usual practice enforced by the service provider.
    For example, if a service provider's hotspots always require a particular encryption and the currently detected AP requires a different encryption method (e.g., open—no encryption) then it is possible this hotspot is a rogue hotspot.
  Whether there is another AP broadcasting the same SSID nearby.
  Whether the MAC address of the AP is legitimately associated with the SSID.
    For high traffic WLAN locations, comparing the # of MACs behind an SSID can be a reliable heuristic to differentiate the official WLAN from a fake one. For example, if one SSID has 12 different APs with 12 different MAC addresses, and another similarly looking SSID has 1 AP with 1 MAC address, it is likely that the SSID with 12 MAC addresses is legitimate.
  Whether the wireless security protocol and encryption cipher being offered by the AP is acceptable. For example, open networks are risky, Wired Equivalent Privacy networks are also risky, Wi-Fi Protected Access (WPA) protocols are somewhat risky, WPA2-PSK (TKIP) is also somewhat risky, and WPA2-PSK (AES) is the best.

A service provider may be an Internet Service Provider (ISP), a hospitality location (e.g., a chain of coffee shops, restaurants, hotels, or the like), retail locations (e.g., stores), or the like. In some of the above indicators, the STA 1050 may associate a given hotspot with a service provider in order to compare observations of a detected hotspot with known characteristics of hotspots provided by the service provider. To associate a given hotspot with a service provider, the STA 1050 may utilize information about service providers and a number of matching techniques. Example techniques include using one or more of: full or partial matches between SSIDs broadcast by the APs and SSIDs typically used by service providers, matches between MAC Addresses and known MAC addresses of service providers, determining that a physical distance of the STA and known hotspots of the service provider is less than a predetermined threshold, and the like. Distances to hotspots in some examples may be determined using Global Positioning Systems on the APs and on the STAs and/or using received signal strength of signals. The information about service providers and the usual practices of a particular service provider may be part of a "signature" file that is preloaded onto the AP and updated when the STA 1050 is connected to a network and is able to communicate with the network-based WLAN trust service 1030.

In order to generate an initial trust score for each WLAN AP, the particular AP being scored may be scored for each of one or more security indicators. Example security indicators were described above. The WLAN AP's initial trust score is then the sum of the individual scores. Each individual score may be calculated based upon a predetermined scoring system that assigns points on how close the AP matched an ideal value for the security indicators. For example, how close the AP matches the expected service provider values, or how well the AP fared on more general questions (e.g., how good the security protocols used are). For example, if the make and model of the AP is consistent with the usual equipment used by the service provider, the AP may score 1 point, otherwise it will score 0 points. Other indicators may have a variable number of points—for example, if the AP partially matches an expected configuration for a particular service provider, partial points between a minimum and maximum may be given. As another example, having no encryption algorithms may receive 0 points for that indicator, whereas Wired Equivalent Privacy may receive 1 point, and encryption such as Wi-Fi Protected Access (WPA) may receive 2 points. Again, The WLAN AP's initial trust score is then the sum of these individual scores.

The initial trust score represents a trustworthiness score computed by the STA 1050 prior to connecting to an AP (during the pre-connection phase). In some examples, rather than a simple summation, each security indicator may have a weight assigned to it such that the initial trust score comprises the result of a weighted summation. The weights may represent a determination that some indicators are more indicative to a security of an AP than others. These weights may be manually determined or may be determined by one or more machine learning algorithms. For example, linear regression, logistic regression, support vector machines, or the like. The machine learning algorithms may learn these weights based upon one or more sets of training data that may comprise the individual indicator scores for an AP and a label of whether or not the AP is trusted. The label may be generated manually, or taken from user data submitted by STAs. In these examples, the model consists of the weights to apply to each individual indicator score. The model in some examples may be constructed by the STA, or may be constructed by the network-based WLAN trust service and sent to the STA when the STA has network connectivity. In some examples, some indicators, once failed, may override all the other indicator values. In these examples, these indicators may be heavily weighted, or in other examples, analysis may stop after determining that the AP failed these indicators and may not proceed to a weighted sum. For example, if the MAC address manufacturer ID mapping is invalid, even if all other indicators are acceptable, the AP may be labelled as dangerous.

In still other examples, the initial trust score may not be based upon the indicators. In these examples, the information is not used to evaluate the security indicators. The information collected about the AP may be input into a classifier which may then determine whether the AP is trusted or not (or output a degree of trust).

In these examples, the training data collected about the APs (as previously described) may be used to build a classifier. For example, one or more decision tree models. These models may be learned using machine learning algorithms operating on the training data built as previously described. Example algorithms to build a decision tree include Iterative Dichotomiser 3 (ID3), C4.5, Classification and Regression Tree (CART), CHi-squared Automatic Interaction Detector (CHAID), MARS, and other algorithms. In these examples, rather than compute weights for the various indicators, one or more of the items of information about an AP is input into the decision tree which produces a designation of whether or not the network is trusted (e.g., classifies the network into safe, potentially safe, and potentially dangerous).

In yet other examples, other types of machine learning classification may be used including support vector machines, Bayesian classification, logistic regression, and the like. In these examples, once the model is constructed, the information collected about the AP is fed into the model which produces a classification of the AP.

In examples in which a machine learned model is used, the model may be built at the STA 1050, the network-based WLAN trust service 1031, or another location. In cases in which the model is built by the STA 1050, the training examples may be based upon training data collected by the STA, but in other examples, may be based upon data provided by the WLAN trust service.

In still other examples, rather than scoring each AP using indicators with summations (or weighted summations), or classifiers, the STA may apply a black or white list of trusted and untrusted networks. For example, the STA may receive a list of good networks and a list of bad networks and their properties and characteristics (for identification) from the network-based WLAN trust service. If the AP matches one of the known good networks (matched based upon the properties of the AP), then the STA 1050 may connect. If the AP matches one of the known bad networks (matched based upon the properties of the AP), then the STA 1050 may be forbidden to connect, or the user may be notified that it is undesirable to connect. In some examples, in enterprise situations, enterprises that own the STAs can generate a white list or black list of APs/MACs signed by the enterprise and preload them on the STA. The signing ensures the list comes from a trust worthy source other than the network-based WLAN trust service. Enterprises can work with the network-based WLAN trust service to obtain the proper signing materials.

After the initial trust score is calculated for each available SSID, each score may be presented to the user. For example, the score may be presented next to the SSIDs of the available networks when the user is selecting a network to connect with to assist the user in selecting a secure network. The networks may be presented in order from most secure to least secure in the network picker application. In some examples, various color codes may designate safe (e.g., green), potentially safe (e.g., yellow) and potentially dangerous (e.g., red) networks based upon the initial trust level or the classification. In some examples, networks that are potentially dangerous are not displayed, and/or not selectable by the user for connection. In other examples, there may be a star rating that may be recognized by users. Networks with more stars would be considered safer. Other examples may include color schemes—e.g., networks colored in green may be considered safe, red may be considered dangerous, and yellow may be considered cautionary.

If the user connects to a network, once the connection is complete, SWCA 1054 may block all network access for application layer 1056 until a second round of checks are completed. This mode may be termed an untrusted connection mode. First, additional checks may be completed by SWCA 1054 against additional security indicators:

Determining if the web-based administrator interface of the AP is accessible (APs with a web interface disabled are more secure)

If AP has the web based interface enabled, determine whether it is protected with a known default password? (If so, the AP is less secure).

Determine the version of Firmware the AP is running? Some versions may be more secure than others.

Determine whether the Gateway and DNS configurations are consistent with the known settings for the ISP.

For example, determine if the AP using a well-known DNS that corresponds to known service providers. If so, the AP is safer. The STA may use a DNSSEC query to establish DNS trust reputation. Also, the STA may check to see if dynamic DNS is used to resolve servers, and check the DNS used against blacklists (e.g., blacklists from the network-based WLAN trust service). Finally, clients in an Enterprise or Home may have a Proxy, DNS search domain, and Private DNS. This can be discovered using a DNS trace. A reverse IP lookup for the DNS/GW address can detect other domains/sites hosted to check against phishing.

Determine whether the AP redirects the STA to a non-SSL (secure socket layer) website to log on upon connection. (If so, the login may be unsecure).

Determine whether a firewall on the STA detects attack vectors (e.g., PING requests, port scans, SAMBA/NFS file share traffic) after connection.

How long has the AP been up since the last reset (higher amounts of time correspond to a higher risk of attacks.)

The information collected about these checks may be used to refine the initial trust score. The initial trust score may be recalculated (using the methods disclosed above for the initial trust score), but this time including the connected security indicators. The refined initial trust score may be communicated to the user of the STA 1050, who may decide to terminate the connection. In other examples, if the refined trust score falls below a predetermined threshold, the connection may be terminated automatically without user intervention.

Also, during this untrusted mode, SWCA 1054 establishes a secure (e.g., through Hyper Text Transfer Protocol Secure—HTTPS channels) connection to a network-based WLAN trust service 1030. Once the connection is established, SWCA 1054 sends information to network-based WLAN trust service 1030. Example information sent includes one or more of: the information collected and analyzed in the pre-connection phase (e.g., to create the initial trust score), the information determined about the AP after the connection (e.g., the additional security indicators), the STA's current location, the list of APs that are detected at the current location and information on those APs (e.g., make and model, security configuration, SSID, and the like), and information about the AP to which the STA is connected. Information about the AP to which the STA is connected that is sent to the network-based WLAN trust service 1031 may include one or more of: the make and model, SSID, FW revision, security configuration settings, real-time traffic info, the Wi-Fi connection profile, location, time of day, frequency and duration of the connection with the AP, DNS configuration and DNS resolution path, gateway configuration, upstream gateway router address and traceroute signatures for a well-known IP (e.g., a query originating from the USA, for a destination in the USA should not route via some other country, watch also for unexpected delays between hops), unusual firewall activity reports from other users, and the like. In some examples, prior to sending these parameters, STA 1050 requests, scans, or collects these from the AP by requesting the parameters, observing parameters of messages sent by the AP to the STA or to other STAs, and the like.

WLAN trust service 1030 sends back a refined trust score calculated by WLAN trust service 1030 based upon the information sent by the STA 1050 as well as information sent by other STAs, and information sent by other APs. In addition WLAN trust service 1030 may make its own observations—for example, if the WLAN AP geolocation reported by the STA doesn't match the STA's location. If the refined trust score is better than a predetermined threshold score, the STA 1050 may allow full access to the network to all applications in application layer 1056. In other examples, STA 1050 informs the user of STA 1050 about the refined trust score and allows the user to decide whether to enter full access state.

In yet other examples, SWCA 1054 may selectively allow access to applications in application layer 1056 based upon the refined trust score. This may be done based upon a list of applications and a minimum trust score needed to allow the application access the network. Applications that are likely to send highly personal information (e.g., email, banking, and social networking applications) may be blocked on marginally safe networks, while other applications (e.g., internet browsing where personal data may not be viewed) may be allowed to use a marginally safe network. Even during the full access or selective access modes, SWCA 1054 continues monitoring AP 1010 and sends information about AP 1010 to WLAN trust service 1030 at regular intervals.

WLAN trust service 1030 provides information to STAs to assist the STAs in calculating the initial trust score such as: a model, rules for a decision tree, access point information, white and black lists to STAs, and the like. This information may be preloaded onto SWCA 1054 and may be updated periodically when SWCA 1054 communicates with WLAN trust service 1030 over a safe network. During the untrusted connection mode, once an STA 1050 is connected to the AP 1010, STA 1050 sends additional information about the AP and the wireless environment to WLAN trust service 1030 over an encrypted connection—using for example, HTTPS.

Example information sent by STA 1050 to WLAN trust service 1030 includes one or more of: a current geolocation of the STA, the list of APs available at the current location, their security related configuration information, make and model, and the like. Also included may be information about the AP it has connected to including firmware revision, initial trust score, security configuration settings, real-time traffic that poses as a security threat (detected by a firewall on the STA), and the like. In some examples, the current list of APs available may be used to determine a location of STA 1050 based upon a database matching locations to APs.

WLAN trust service 1030 receives information on APs from multiple STAs and from other APs and is able to perform a more thorough analysis of the AP the STA using multiple sources of information. STAs connected to the AP may also continuously send information about the AP—for example, threats detected by a firewall application running on the STAs. WLAN trust service 1030 may continuously update the security assessment of the AP and may notify STAs connected to the AP (and registered with the WLAN trust service) if the security assessment indicates a security risk. In addition, users of the STA may post rankings of the AP. For example, if the user discovers that information was stolen, the user may report the AP to WLAN trust service 1030.

Network-based WLAN trust service 1030 may include a secure WLAN server agent 1032 which may include a risk analyzer 1034, notification agent 1036, and knowledge database 1038. Network-based WLAN trust service 1030 may receive information about APs from STAs and other APs (e.g., AP 1020 may send information about AP 1010 to network-based WLAN trust service 1030 and vice versa). Network-based WLAN trust service 1030 may then determine if that AP has been previously reported and if there is any information about the AP. For example, network-based WLAN trust service 1030 may determine that an AP corresponds to one or more records by matching one or more of: Medium Access Control (MAC) addresses, SSIDs, neighboring SSIDs, make, model, IP Address (e.g., the STA's IP address), and other information about the AP. In some examples, the match may be a fuzzy match based upon the AP matching a threshold number of parameters. These operations may be performed by risk analyzer module 1034.

If the AP is not matched, then risk analyzer 1034 of WLAN trust service 1030 may calculate a refined trust score based upon the information sent about the AP and store the information about the AP and the trust score in knowledge database 1038. If the information sent to WLAN trust service 1030 was from an STA that is in an untrusted mode, network-based WLAN trust service 1030 sends the STA the refined trust score. STA may then either proceed to a trusted connection state, or may terminate the connection.

If the AP is matched to a database record, then risk analyzer 1034 may combine the newly reported information with the old information and update a trust score for the AP stored in knowledge database 1038 based upon a combination of the stored information and the newly received information. If the information sent to WLAN trust service 1030 was from an STA that is in an untrusted mode, the network-based WLAN trust service 1030 sends the STA the refined trust score. The STA may then either proceed to a trusted connection state, or may terminate the connection. The information stored about an AP in the network-based WLAN trust service may be weighted based upon how long ago the information was received. Thus, newer information may be weighted more heavily than stale information. After a certain predetermined time threshold, the old information may be removed from the knowledge database 1038.

Risk analyzer 1034 may calculated a refined trust score based upon a number of techniques. In one example, the risk analyzer 1034 may have a list of security criteria and score the AP based upon how well it meets these criteria. The sum of these criteria scores may be a refined trust score. Example criteria are described above with respect to the pre and post connection checks by the STA. In other examples, the criteria may be weighted to give more importance in the calculation to certain criteria which may be more indicative of security than other criteria. The weightings may be generated based upon one or more machine learning algorithms as described above with respect to the initial trust score.

In other examples, the risk analyzer 1034 may generate a machine learned classification model, such as a decision tree, support vector machine, or logistic regression model. The model is configured to predict the likelihood or probability than an AP is safe, given characteristics of the AP sent by other APs and STAs. The model is trained based on positive and/or negative training data. For example, the positive training data may include AP characteristic vectors corresponding to known secure APs. Similarly, the negative training data may include characteristic vectors corresponding to known insecure or compromised APs. Accordingly, based on such training feature data, the coefficients of a logistic regression model may be trained to generate a trained machined learned model configured to predict the likelihood that an AP is secure. Using a machine learned model, characteristics of a new, or newly updated characteristics of an AP may be input into the model in order to determine the probability that it is or is not secure.

In some examples, the Secure WLAN server Agent 1032 may store a white list and/or black list of APs and their characteristics (for identification) in the knowledge database 1038. Notification agent 1036 may notify STAs when changes are made to this list. STAs then use this list at connection time to determine safe APs and dangerous APs.

Notification agent 1036 accepts registrations from STAs and computing devices associated with service providers that wish to receive security updates on APs. The registration message may indicate criteria for notifying the STA or computing device, including which APs they are interested in monitoring. If an AP's security rating drops by a predetermined amount, the notification agent 1036 may notify entities registered for such notifications regarding that AP. For example, upon connecting with an AP and in the untrusted mode, an STA may register with the notification agent 1036 to receive notifications on that AP. Prior to disconnecting with the AP, the STA may unregister with the notification agent 1036. While the STA is connected to the AP, if the STA receives a notification of a change in the security rating of the AP, the STA may take one or more actions. Actions may include disconnecting from the AP, restricting access to the network from one or more applications in the application layer 1056 (e.g., depending on minimum levels of trust established for that application), prompting the user, or the like.

In addition, service providers may also register with the notification agent 1036 to receive notifications on APs they manage. If one or more of the APs they manage becomes misconfigured, or is under attack, such that they become a security threat, the notification agent 1026 notifies a computing device associated with the service provider. This can extend to imposter networks as well. The Secure WLAN Server Agent 1032 can also notify a service provider of APs that are suspiciously similar to APs registered to the service provider in order for the service provider to take action against the imposter network.

In addition the APs themselves may monitor their surroundings and report on the security robustness of other APs in the area. For example, AP 1020 may have a secure WLAN monitoring agent 1024 which may periodically scan for other APs in the area and gather and obtain information about the APs from these scans. This information may then be forwarded to the Secure WLAN trust service 1030. In some examples, when a set of APs are deployed (e.g., being setup by a service provider), they would initially "discover" each other. In this discovery phase, the APs would detect the APs in range and record their properties. These properties would be submitted to the Network-based WLAN trust service 1030. After the discovery phase, the APs will watch for new APs in the area. If a new AP is detected the APs will evaluate the new AP by retrieving information like SSID, MAC address, security configuration, and the like to verify the validity of the AP. This information will be reported to the network-based WLAN trust service 1030.

The information that can be gathered by an AP about another AP may vary based upon the hardware capabilities of the AP. Examples include gathering SSID, MAC address, make and model, and the like. At a more advanced level, the secure WLAN monitoring agent 1024 may connect to APs in the neighborhood as an STA and perform additional information gathering. Furthermore, once connected, the AP may check to see if the Domain Name Service (DNS) used by the new AP is legitimate (e.g., based upon a white list, or a comparison to its own DNS). The AP may also utilize tools such as traceroute to determine whether the route followed by a packet to a known destination follows a safe route.

If the new AP has the same SSID as the scanning AP, the scanning AP may check to make sure the traceroute through the new AP matches the traceroute through the scanning AP, that the make and model of the AP is identical, that the security protocols match, that a well-known destination is reachable, that the DNS matches, and there are no inbound probes or other alerts from a firewall. In some examples, in order to limit the chances that the AP 1020 would be infected by a rouge AP, the secure WLAN monitoring agent 1024 would have its own WLAN layer and may operate in protected resources (e.g., memory) of the AP 1020. WLAN layer 1022 of AP 1020 provides a WLAN network (e.g., a hotspot) providing access to STAs to network 1025. WLAN layer 1022 may implement the Physical (PHY), Medium Access Control (MAC), and Logical Link Control (LLC) layers of the 802.11 specification as an Access Point. All this information may be passed to the network-based WLAN trust service 1030.

In some cases an STA may have an out-of-band connection to the network without having to go through the AP. In these examples SWCA 1054 of STA 1050 may contact network-based WLAN trust service 1030 prior to connecting to an AP 1010.

Figure 2:
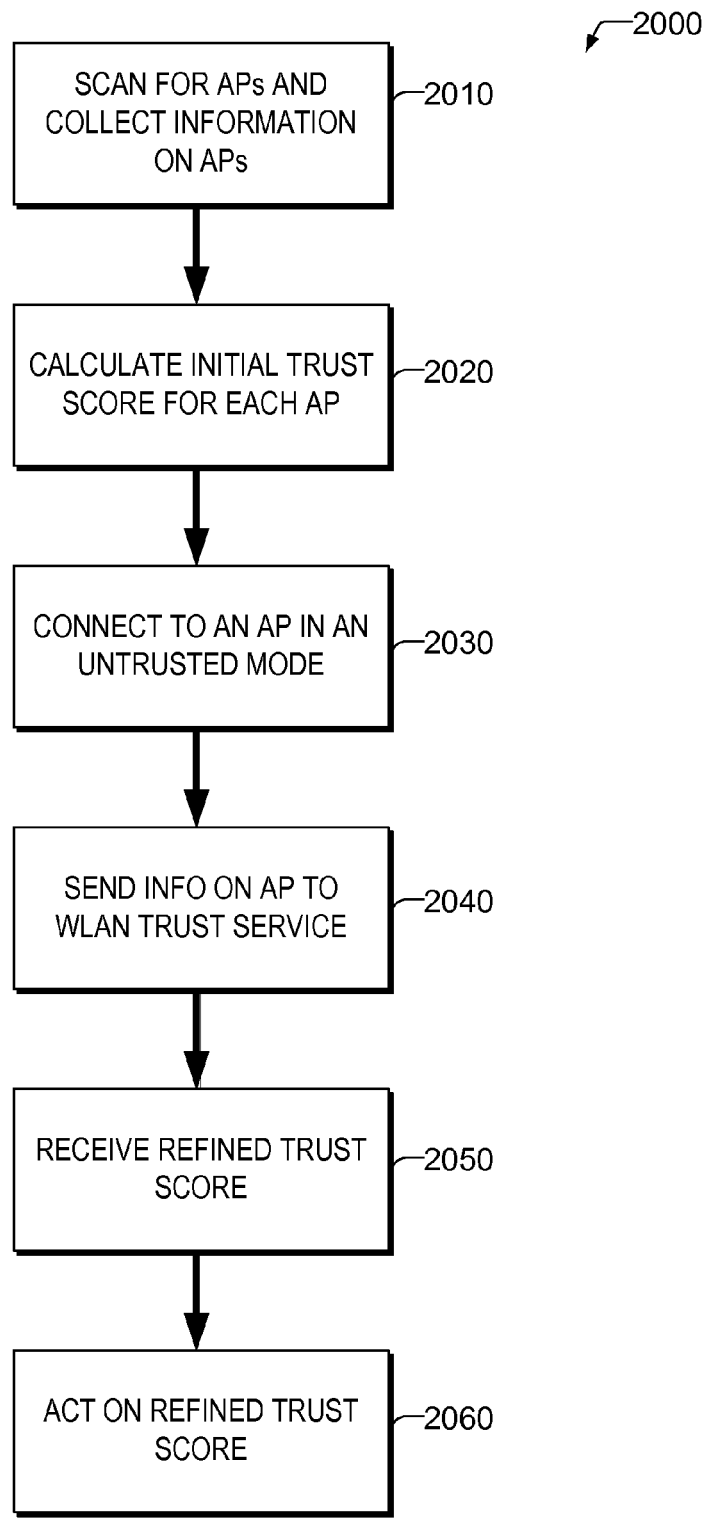
FIG. 2 shows a flowchart of a method of a STA securely connecting to a public hotspot is shown.

Turning now to FIG. 2, a flowchart of a method 2000 of an STA securely connecting to a public hotspot is shown. At operation 2010, the STA scans for APs and obtains information on the APs used to determine an initial trust score. In some examples, the WLAN layer module 1052 may execute this operation. For example, the STA may scan for 802.11 beacon frames sent by the APs. These beacons, which are periodically sent by an AP contain information about the AP. In other examples, the station may send a probe request and receive a probe response with information about the AP. Other messages, such as authentication frames may also be exchanged.

At operation 2020, the STA calculates an initial trust score for each of the APs that were found during the scan. In some examples, the secure WLAN connection agent module 1054 may execute this operation. As previously explained the initial trust score may be calculated by assigning scores to individual security indicators and then applying a summation (and in some examples, a weighted summation). In other examples, the information about the AP may be input into a machine learning model which calculates a trust score (or classifies the AP into trusted or untrusted).

The initial trust scores may be displayed to a user. In some examples, one or more of the WLAN layer module 1052, the Secure WLAN connection Agent module 1054, an application in the application layer 1056, or an operating system may execute this operation. In some examples, the initial trust scores may be displayed alongside the SSIDs of the APs found during the scanning phase at operation 2010 in a graphical user interface (GUI) of a network chooser. Using the GUI of the network chooser, a user may select an AP to connect to.

At operation 2030, the STA may connect to the AP in an untrusted mode. In some examples, the WLAN layer module 1052 may execute this operation. In the untrusted mode, applications other than the SHCA may be blocked from accessing the network. In other examples, only certain applications (e.g., those likely to transmit sensitive information as determined by the STA using a list of predetermined applications) may be blocked from accessing the network provided by the AP. In still other examples, the untrusted mode may be optional.

At operation 2040, the STA may establish a secure connection to the network-based WLAN trust service and may send information that was collected in operation 2010 to the trust service as well as any subsequent information learned about the AP as a result of connecting to the AP at operation 2030. In some examples, this operation may be executed by the SWCA 1054 of the STA in conjunction with the WLAN layer module 1052. Additionally information may also be provided such as attack attempts detected by a firewall application on the STA.

At operation 2050, the STA may receive the refined trust score for the AP from the WLAN trust service. In some examples, this operation may be executed by the SWCA 1054 of the STA in conjunction with the WLAN layer module 1052. At operation 2060, the refined trust score may be acted upon by the STA. In some examples, the STA may simply display the refined trust score and allow the user to choose to allow full access to the connection from all applications, disconnect with the hotspot, or allow selective access to certain applications. In some examples, this operation may be executed by one or more of the SWCA 1054, WLAN layer module 1052, an application that is part of application layer 1056, or an operating system.

In other examples, the STA may automatically take action based upon the refined trust score. For example the STA may employ thresholds to determine actions to take based upon the refined trust score. If the refined trust score is below a minimum threshold, then the STA may automatically disconnect from the AP. If the refined trust score is above the minimum threshold but below a second threshold, the STA may prompt the user for a decision, or allow selective access (which itself may have a series of rules that specifies access based upon an application and a minimum trust score for that application to be allowed access to the network.) If the refined trust score is above the second threshold, then full access may be granted to all applications. In some examples, this operation may be executed by one or more of the SWCA 1054, WLAN layer module 1052, an application that is part of application layer 1056, or an operating system.

After the STA (e.g., the SWCA 1054) grants partial or full access, the STA may continue to monitor the AP. Suspicious activity, such as attacks detected by a firewall of the STA may be reported to the network-based WLAN trust service. Additionally, any change in the information first sent by the STA to the network-based WLAN trust service may also be reported to the network-based WLAN trust service. In some examples, this operation may be executed by the SWCA 1054.

Figure 3:
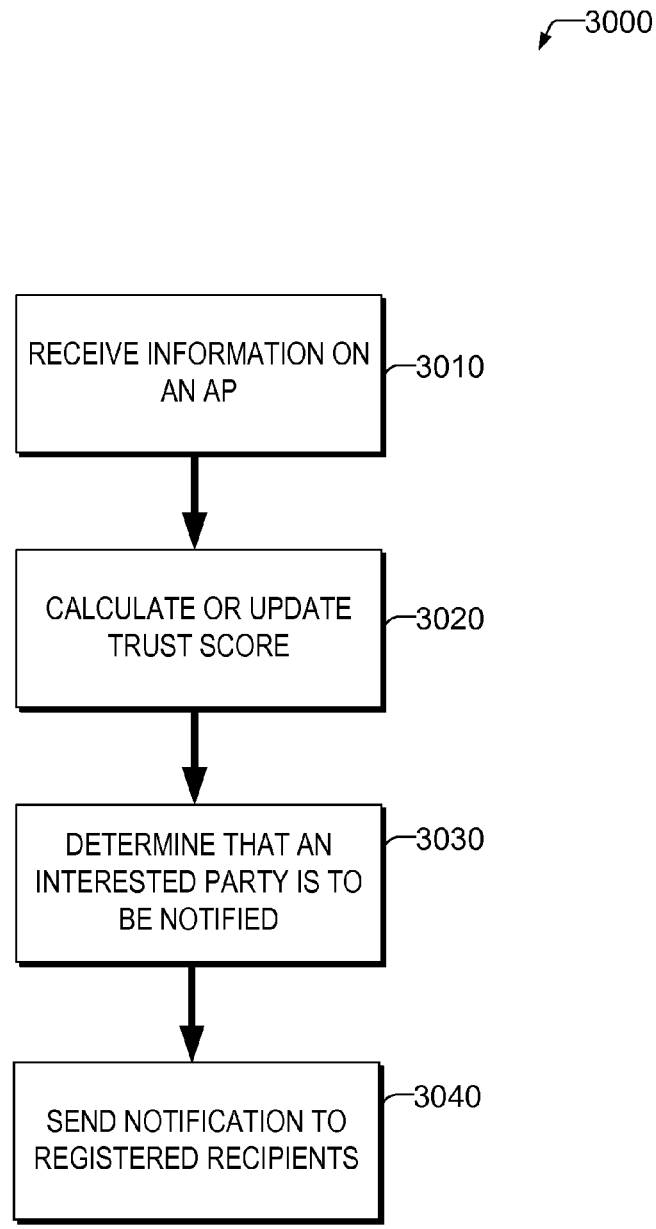
FIG. 3 shows a flowchart of a method of a network-based trust service is shown.

Turning now to FIG. 3 a flowchart of a method 3000 of a network-based trust service is shown. At operation 3010 the network-based trust service receives information on a particular AP. In some examples, this operation may be performed by the risk analyzer module 1034. This information may be from an STA after connecting to the particular AP. In other cases, this information may be from another AP monitoring the particular AP. The network-based trust service may attempt to determine if it has previously received information on this AP and to add the newly received information to the previously received information (or update the previously received information). At operation 3020, the network-based trust service may calculate or update the previously stored trust score. As previously explained the trust score may be calculated by assigning scores to individual security indicators and then applying a summation (and in some examples, a weighted summation). In other examples, the information about the AP may be input into a machine learning model which calculates a trust score (or classifies the AP into trusted or untrusted). In some examples, this operation may be performed by the risk analyzer module 1034 and may utilize information in the knowledge database module 1038.

At operation 3030, the network-based WLAN trust service determines whether an interested party is to be notified. In some examples, this operation may be performed by the notification agent module 1034. If the information received at operation 3010 was from an STA that was requesting a refined trust score, then that STA is considered an interested party that will be notified of the trust score. In other examples, other interested parties (such as an STA connected to the AP, or a service provider) may register with the network-based WLAN trust service. As part of the registration process, each interested party may specify one or more triggering conditions for when the interested party is to be notified by the WLAN trust service. Example triggering conditions include a change in the trust score that exceeds a supplied threshold, whenever the trust level falls below a supplied threshold, and the like. At operation 3030 the network-based WLAN trust service may evaluate these triggering conditions to determine whether any of them are met.

At operation 3040, the WLAN trust service may notify one or more interested parties that the triggering condition has been met. In some examples, this operation may be performed by the risk analyzer module 1034. The notification may be an email, an application specific message, a text message, an automated phone call, or the like. In some examples, when the information received at operation 3010 is from an STA that has recently connected to the particular AP and is in the untrusted mode, then the STA is notified of the trust score calculated on the network-based WLAN trust service (i.e., the refined trust score) at operation 3040 by way of an application message.

Figure 4:
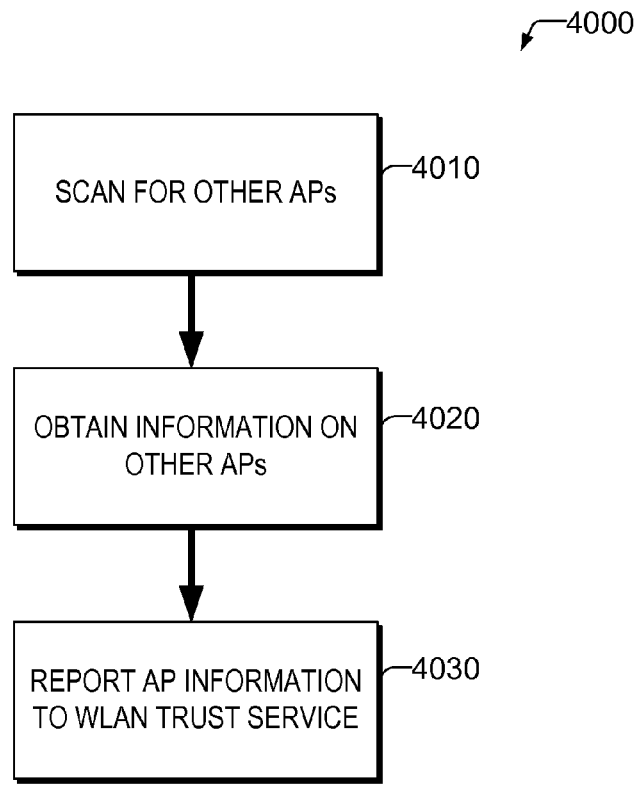
FIG. 4 shows a flowchart of a method of an AP reporting information on other APs is shown.

Turning now to FIG. 4, a flowchart of a method 4000 of an AP reporting information on other APs is shown. At operation 4010, the AP may scan for other, neighboring APs. In some examples, this operation may be performed by the WLAN layer module 1022. At operation 4020, the AP may obtain information on the other, neighboring APs. In some examples, this operation may be performed by the WLAN layer module 1022. As already noted, the information that may be obtained may depend on the capabilities of the AP that is gathering the information. At operation 4030 the information may be reported to the network-based WLAN trust service. In some examples, this operation may be performed by the secure WLAN monitoring agent 1024. The secure WLAN monitoring agent 1024 may direct the method 4000 of FIG. 4.

Figure 5:
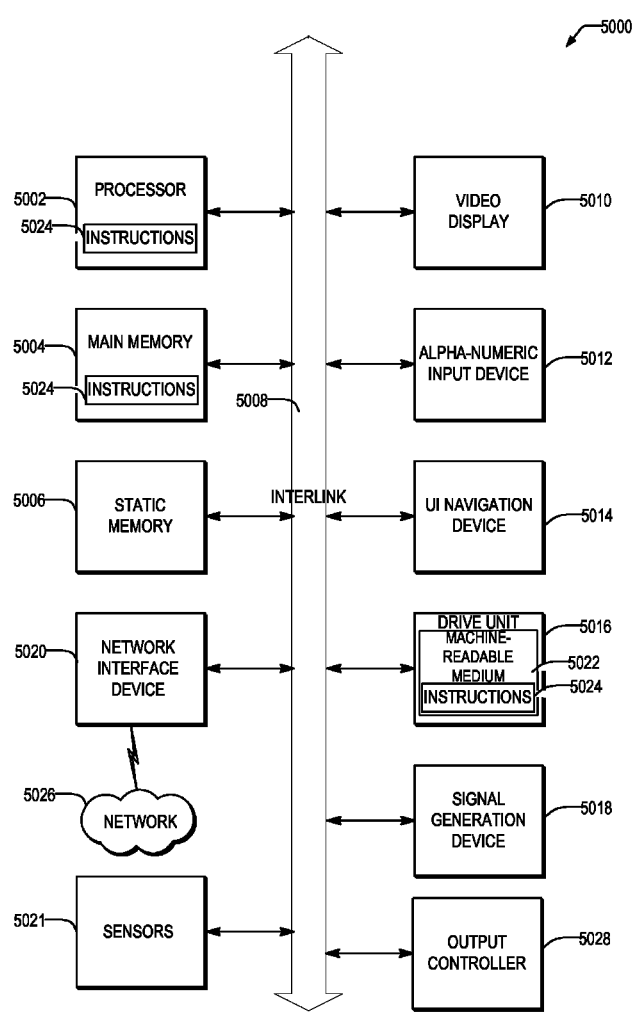
FIG. 5 illustrates a block diagram of an example machine 5000 which may implement any one or more of the techniques (e.g., methodologies) discussed herein.

FIG. 5 illustrates a block diagram of an example machine 5000 which may implement any one or more of the techniques (e.g., methodologies) discussed herein, for example the methods of FIGS. 2-4 and the modules of FIG. 1. In alternative embodiments, the machine 5000 may operate as a standalone device or may be connected (e.g., networked) to other machines. In a networked deployment, the machine 5000 may operate in the capacity of a server machine, a client machine, or both in server-client network environments. In an example, the machine 5000 may act as a peer machine in peer-to-peer (P2P) (or other distributed) network environment. The machine 5000 may be a AP, STA, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are a descriptor to those of ordinary skill in the art connoting either hardware or software structure. Modules are packaged functional hardware units designed for use with other components or alternatively part of a program that executes on a processor and performs a particular function of related functions. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 5000 may include a hardware processor 5002 (e.g., a central processing unit (CPU), a graphics processing unit (GPU), a hardware processor core, or any combination thereof), a main memory 5004 and a static memory 5006, some or all of which may communicate with each other via an interlink (e.g., bus) 5008. The machine 5000 may further include a display unit 5010, an alphanumeric input device 5012 (e.g., a keyboard), and a user interface (UI) navigation device 5014 (e.g., a mouse). In an example, the display unit 5010, input device 5012 and UI navigation device 5014 may be a touch screen display. The machine 5000 may additionally include a storage device (e.g., drive unit) 5016, a signal generation device 5018 (e.g., a speaker), a network interface device 5020, and one or more sensors 5021, such as a global positioning system (GPS) sensor, compass, accelerometer, or other sensor. The machine 5000 may include an output controller 5028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 5016 may include a machine readable medium 5022 on which is stored one or more sets of data structures or instructions 5024 (e.g., software) embodying or utilized by any one or more of the techniques or functions described herein. The instructions 5024 may also reside, completely or at least partially, within the main memory 5004, within static memory 5006, or within the hardware processor 5002 during execution thereof by the machine 5000. In an example, one or any combination of the hardware processor 5002, the main memory 5004, the static memory 5006, or the storage device 5016 may constitute machine readable media.

While the machine readable medium 5022 is illustrated as a single medium, the term "machine readable medium" may include a single medium or multiple media (e.g., a centralized or distributed database, and/or associated caches and servers) configured to store the one or more instructions 5024.

The term "machine readable medium" may include any medium that is capable of storing, encoding, or carrying instructions for execution by the machine 5000 and that cause the machine 5000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 5024 may further be transmitted or received over a communications network 5026 using a transmission medium via the network interface device 5020. The Machine 5000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 5020 may include one or more physical jacks (e.g., Ethernet, coaxial, or phone jacks) or one or more antennas to connect to the communications network 5026. In an example, the network interface device 5020 may include a plurality of antennas to wirelessly communicate using at least one of single-input multiple-output (SIMO), multiple-input multiple-output (MIMO), or multiple-input single-output (MISO) techniques. In some examples, the network interface device 5020 may wirelessly communicate using Multiple User MIMO techniques.

OTHER NOTES AND EXAMPLES

Example 1 includes subject matter (such as a wireless STA implemented as a device, apparatus, or machine) comprising: a processor to instantiate: a wireless local area network (WLAN) layer module to: scan for an access point; a secure WLAN connection agent module to: determine an initial trust score for the access point based upon information collected about the access point; upon connecting to the access point, block network access to applications running on the wireless STA; send at least the collected information to a network-based WLAN trust service; receive a refined trust score from the WLAN trust service; and responsive to receiving the refined trust score, allowing at least partial network access to the applications running on the wireless STA.

In Example 2, the subject matter of Example 1 may include, wherein the secure WLAN connection agent module is to cause the initial trust score to be displayed along with an SSID of the access point in a network picker graphical user interface.

In Example 3, the subject matter of any one of Examples 1 to 2 may include, wherein the WLAN layer module is to authenticate and associate with the access point responsive to a user selection of the access point in the network picker graphical user interface.

In Example 4, the subject matter of any one of Examples 1 to 3 may include, wherein the secure WLAN connection agent module is to determine the initial trust score based upon the information and a model built using a machine learning algorithm.

In Example 5, the subject matter of any one of Examples 1 to 4 may include, wherein the machine learning algorithm is a logistic regression algorithm.

In Example 6, the subject matter of any one of Examples 1 to 5 may include, wherein the secure WLAN connection agent module is to receive the model from the network-based WLAN trust service.

In Example 7, the subject matter of any one of Examples 1 to 6 may include, wherein the secure WLAN connection agent module is to determine the initial trust score based upon a comparison of the information to a plurality of security indicators.

In Example 8, the subject matter of any one of Examples 1 to 7 may include, wherein the comparison of the information to a plurality of security indicators generates a score for each of the plurality of security indicators and wherein the initial trust score is a weighted sum of the scores.

Example 9 includes subject matter (such as a method, means for performing acts, machine readable medium including instructions that when performed by a machine cause the machine to performs acts, or an apparatus to perform) comprising: using a computer processor of a device to perform the operations of: scanning for an access point; collecting information on the access point; determining an initial trust score for the access point based upon the information; upon connecting to the access point, blocking network access to applications on the device; establishing a connection with a network-based WLAN trust service; sending at least the collected information to the network-based WLAN trust service; receiving a refined trust score from the WLAN trust service; and responsive to receiving the refined trust score, allowing at least partial network access to the applications running on the device.

In Example 10, the subject matter of Example 9 may include, causing the initial trust score to be displayed along with an SSID of the access point in a network picker graphical user interface.

In Example 11, the subject matter of any one of Examples 9 to 10 may include, comprising responsive to a user selection of the access point in the network picker graphical user interface authenticating and associating with the access point.

In Example 12, the subject matter of any one of Examples 9 to 11 may include, comprising determining the initial trust score based upon the information and a model built using a machine learning algorithm.

In Example 13, the subject matter of any one of Examples 9 to 12 may include, wherein the machine learning algorithm is a logistic regression algorithm.

In Example 14, the subject matter of any one of Examples 9 to 13 may include, comprising receiving the model from the network-based WLAN trust service.

In Example 15, the subject matter of any one of Examples 9 to 14 may include, comprising wherein determining the initial trust score is based upon a comparison of the information to a plurality of security indicators.

In Example 16, the subject matter of any one of Examples 9 to 15 may include, wherein the comparison of the information to a plurality of security indicators generates a score for each of the plurality of security indicators and wherein the initial trust score is a weighted sum of the scores.

Example 17 includes subject matter (such as a CRM) comprising: scanning for an access point; collecting information on the access point; determining an initial trust score for the access point based upon the information; upon connecting to the access point, blocking network access to applications running on the machine; establishing a connection with a network-based WLAN trust service; sending at least the collected information to the network-based WLAN trust service; receiving a refined trust score from the WLAN trust service; and responsive to receiving the refined trust score, allowing at least partial network access to the applications running on the machine.

In Example 18, the subject matter of Example 17 may include, wherein the operations comprise: causing the initial trust score to be displayed along with an SSID of the access point in a network picker graphical user interface.

In Example 19, the subject matter of any one of Examples 17 to 18 may include, wherein the operations comprise: responsive to a user selection of the access point in the network picker graphical user interface authenticating and associating with the access point.

In Example 20, the subject matter of any one of Examples 17 to 19 may include, wherein the operations comprise determining the initial trust score based upon the information and a model built using a machine learning algorithm.

In Example 21, the subject matter of any one of Examples 17 to 20 may include, wherein the machine learning algorithm is a logistical regression algorithm.

In Example 22, the subject matter of any one of Examples 17 to 21 may include, wherein the operations comprise receiving the model from the network-based WLAN trust service.

In Example 23, the subject matter of any one of Examples 17 to 22 may include, wherein the operations comprise determining the initial trust score based upon a comparison of the information to a plurality of security indicators.

In Example 24, the subject matter of any one of Examples 17 to 23 may include, wherein the comparison of the information to the plurality of security indicators generates a score for each of the plurality of security indicators and wherein the initial trust score is a weighted sum of the scores.

Example 25 includes subject matter (such as a wireless STA implemented by a device, apparatus, or machine) comprising: means for scanning for an access point; means for collecting information on the access point; means for determining an initial trust score for the access point based upon the information; upon connecting to the access point, means for blocking network access to applications on the device; means for establishing a connection with a network-based WLAN trust service; means for sending at least the collected information to the network-based WLAN trust service; means for receiving a refined trust score from the WLAN trust service; and responsive to receiving the refined trust score, means for allowing at least partial network access to the applications running on the device.

In Example 26, the subject matter of Example 25 may include, means for causing the initial trust score to be displayed along with an SSID of the access point in a network picker graphical user interface.

In Example 27, the subject matter of any one of Examples 25 to 26 may include, comprising responsive to a user selection of the access point in the network picker graphical user interface means for authenticating and associating with the access point.

In Example 28, the subject matter of any one of Examples 25 to 27 may include, comprising means for determining the initial trust score based upon the information and a model built using a machine learning algorithm.

In Example 29, the subject matter of any one of Examples 25 to 28 may include, comprising means for receiving the model from the network-based WLAN trust service.

In Example 30, the subject matter of any one of Examples 25 to 29 may include, comprising wherein the means for determining the initial trust score is based upon a comparison of the information to a plurality of security indicators.

In Example 31, the subject matter of any one of Examples 25 to 30 may include, wherein the comparison of the information to a plurality of security indicators generates a score for each of the plurality of security indicators and wherein the initial trust score is a weighted sum of the scores.

Example 32 includes subject matter (such as a network-based wireless local area network (WLAN) trust service implemented by a device, apparatus, or machine) comprising: a processor to instantiate: a risk analyzer module to: receive information about an access point; combine the information with other information known about the access point that is stored in a database to create combined information about the access point; and calculate a trust score for the access point based upon the information and the other information; and a notification module to: notify a device of the trust score.

In Example 33, the subject matter of Example 32 may include, wherein the information is received from a wireless STA, and wherein the notification module is to notify the device of the trust score by at least notifying the wireless STA.

In Example 34, the subject matter of any one of Examples 32 to 33 may include, wherein the notification module is to notify a device based upon a determination that the trust score is below a predetermined threshold.

In Example 35, the subject matter of any one of Examples 32 to 34 may include, wherein the information is received from a second access point.

In Example 36, the subject matter of any one of Examples 32 to 35 may include, wherein the device is a device associated with a service provider.

In Example 37, the subject matter of any one of Examples 32 to 36 may include, wherein the risk analyzer module is to calculate the trust score using a model created with a machine learning algorithm and the combined information.

In Example 38, the subject matter of any one of Examples 32 to 37 may include, wherein the risk analyzer module is to build the model using a machine learning algorithm and wherein the notification module is to send the model to a wireless STA.

Example 39 includes subject matter (such as a method, means for performing acts, machine readable medium including instructions that when performed by a machine cause the machine to performs acts, or an apparatus to perform) comprising: using a computer processor of a device to perform the operations of: receiving, over a network, information about an access point; combining the information with other information known about the access point that is stored in a database to create combined information about the access point; calculating a trust score for the access point based upon the information and the other information; and notifying a device, over the network, of the trust score.

In Example 40, the subject matter of Example 39 may include, wherein the information is received from a wireless STA, and wherein the notifying the device of the trust score comprises notifying the wireless STA.

In Example 41, the subject matter of any one of Examples 39 to 40 may include, wherein notifying the device comprises notifying the device based upon a determination that the trust score is below a predetermined threshold.

In Example 42, the subject matter of any one of Examples 39 to 41 may include, wherein the information is received from a second access point.

In Example 43, the subject matter of any one of Examples 39 to 42 may include, wherein the device is a device associated with a service provider.

In Example 44, the subject matter of any one of Examples 39 to 43 may include, wherein calculating the trust score comprises using a model created with a machine learning algorithm and the combined information.

In Example 45, the subject matter of any one of Examples 39 to 44 may include, wherein the method comprises building the model using a machine learning algorithm and sending the model to a wireless STA.

Example 46 includes subject matter (such as a CRM) comprising: receiving, over a network, information about an access point; combining the information with other information known about the access point that is stored in a database to create combined information about the access point; calculating a trust score for the access point based upon the information and the other information; and notifying a device, over the network, of the trust score.

In Example 47, the subject matter of Example 46 may include, wherein the information is received from a wireless STA, and wherein the operations of notifying the device of the trust score comprises notifying the wireless STA.

In Example 48, the subject matter of any one of Examples 46 to 47 may include, the operations of notifying the device of the trust score comprises notifying the device based upon a determination that the trust score is below a predetermined threshold.

In Example 49, the subject matter of any one of Examples 46 to 48 may include, wherein the information is received from a second access point.

In Example 50, the subject matter of any one of Examples 46 to 49 may include, wherein the device is a device associated with a service provider.

In Example 51, the subject matter of any one of Examples 46 to 50 may include, wherein the operations of calculating the trust score comprise using a model created with a machine learning algorithm and the combined information.

In Example 52, the subject matter of any one of Examples 46 to 51 may include, wherein the operations comprise building the model using a machine learning algorithm and sending the model to a wireless STA.

Example 53 includes subject matter (such as a network-based wireless local area network (WLAN) trust service implemented by a device, apparatus, or machine) comprising: using a computer processor of a device to perform the operations of: receiving, over a network, information about an access point; combining the information with other information known about the access point that is stored in a database to create combined information about the access point; calculating a trust score for the access point based upon the information and the other information; and notifying a device, over the network, of the trust score.

In Example 54, the subject matter of Example 53 may include, wherein the information is received from a wireless STA, and wherein the notifying the device of the trust score comprises means for notifying the wireless STA.

In Example 55, the subject matter of any one of Examples 53 to 54 may include, wherein notifying the device comprises means for notifying the device based upon a determination that the trust score is below a predetermined threshold.

In Example 56, the subject matter of any one of Examples 53 to 55 may include, wherein the information is received from a second access point.

In Example 57, the subject matter of any one of Examples 53 to 56 may include, wherein the device is a device associated with a service provider.

In Example 58, the subject matter of any one of Examples 53 to 57 may include, wherein calculating the trust score comprises using a model created with a machine learning algorithm and the combined information.

In Example 59, the subject matter of any one of Examples 53 to 58 may include, means for building the model using a machine learning algorithm and sending the model to a wireless STA.

Example 60 includes subject matter (such as a method, means for performing acts, machine readable medium including instructions that when performed by a machine cause the machine to performs acts, or an apparatus to perform) comprising: at a wireless access point using a processor: providing a wireless local area network (WLAN) hotspot; scanning for a neighboring access point; gathering information on the neighboring access point; and sending the information, over a network, to a network-based WLAN trust service.

In Example 61, the subject matter of Example 60 may include, wherein gathering information on the neighboring access point comprises connecting to the access point as a STA.

In Example 62, the subject matter of any one of Examples 60 to 61 may include, wherein gathering information on the neighboring access point comprises observing wireless communications between the neighboring access point and a STA connected to the neighboring access point.

In Example 63, the subject matter of any one of Examples 60 to 62 may include, wherein gathering information comprises gathering one or more of: Service Set Identifier (SSID), encryption information, model of the neighboring access point.

In Example 64, the subject matter of any one of Examples 60 to 63 may include, determining that the neighboring access point is a new access point and notifying the device that the neighboring access point is new.

Example 65 includes subject matter (such as a CRM) comprising: providing a wireless local area network (WLAN) hotspot; scanning for a neighboring access point; gathering information on the neighboring access point; and sending the information, over a network, to a network-based WLAN trust service.

In Example 66, the subject matter of Example 65 may include, wherein the operations of gathering information on the neighboring access point comprises connecting to the access point as a STA.

In Example 67, the subject matter of any one of Examples 65 to 66 may include, wherein the operations of gathering information on the neighboring access point comprises observing wireless communications between the neighboring access point and a STA connected to the neighboring access point.

In Example 68, the subject matter of any one of Examples 65 to 67 may include, wherein the operations of gathering information comprises gathering one or more of: Service Set Identifier (SSID), encryption information, model of the neighboring access point.

In Example 69, the subject matter of any one of Examples 65 to 68 may include, wherein the operations comprise determining that the neighboring access point is a new access point and notifying the network-based WLAN trust service that the neighboring access point is new.

Example 70 includes subject matter (such as a wireless access point implemented by a device, apparatus, or machine) comprising: a computer processors to instantiate: a wireless local area network (WLAN) layer module to: provide a WLAN hotspot; and a secure WLAN monitoring agent module to: scan for a neighboring access point; gather information on the neighboring access point; and send the information, over a network, to a network-based WLAN trust service.

In Example 71, the subject matter of Example 70 may include, wherein the secure WLAN monitoring agent module is to gather information on the neighboring access point by at least connecting to the access point as a STA.

In Example 72, the subject matter of any one of Examples 70 to 71 may include, secure WLAN monitoring agent module is to gather information on the neighboring access point by at least observing wireless communications between the neighboring access point and a STA connected to the neighboring access point.

In Example 73, the subject matter of any one of Examples 70 to 72 may include, secure WLAN monitoring agent module is to gather information on the neighboring access point by at least gathering one or more of: Service Set Identifier (SSID), encryption information, model of the neighboring access point.

In Example 74, the subject matter of any one of Examples 70 to 73 may include, secure WLAN monitoring agent module is to gather information on the neighboring access point by at least determining that the neighboring access point is a new access point and notifying the network-based WLAN trust service that the neighboring access point is new.

Example 75 includes subject matter (such as a device, apparatus, or machine) comprising: means for providing a wireless local area network (WLAN) hotspot; means for scanning for a neighboring access point; means for gathering information on the neighboring access point; and means for sending the information, over a network, to a network-based WLAN trust service.

In Example 76, the subject matter of Example 75 may include, wherein gathering information on the neighboring access point comprises connecting to the access point as a STA.

In Example 77, the subject matter of any one of Examples 75 to 76 may include, wherein gathering information on the neighboring access point comprises observing wireless communications between the neighboring access point and a STA connected to the neighboring access point.

In Example 78, the subject matter of any one of Examples 75 to 77 may include, wherein gathering information comprises gathering one or more of: Service Set Identifier (SSID), encryption information, model of the neighboring access point.

In Example 79, the subject matter of any one of Examples 75 to 78 may include, means for determining that the neighboring access point is a new access point and means for notifying the network-based WLAN trust service that the neighboring access point is new.

What is claimed is:
1. A wireless STA comprising:
 a hardware processor to instantiate:
  a wireless local area network (WLAN) layer module to:
   scan for an access point;
  a secure WLAN connection agent module to:
   determine an initial trust score for the access point based upon information collected about the access point;
   upon connecting to the access point, block network access to applications running on the wireless STA;
   send at least the collected information to a network-based WLAN trust service;
   receive a refined trust score from the WLAN trust service; and
   responsive to receiving the refined trust score, allowing at least partial network access to the applications running on the wireless STA.
2. The wireless STA of claim 1,
 wherein the secure WLAN connection agent module is to cause the initial trust score to be displayed along with an SSID of the access point in a network picker graphical user interface.

3. The wireless STA of claim 2,
wherein the WLAN layer module is to authenticate and associate with the access point responsive to a user selection of the access point in the network picker graphical user interface.

4. The wireless STA of claim 1,
wherein the secure WLAN connection agent module is to determine the initial trust score based upon the information and a model built using a machine learning algorithm.

5. The wireless STA of claim 4,
wherein the machine learning algorithm is a logistical regression algorithm.

6. The wireless STA of claim 4,
wherein the secure WLAN connection agent module is to receive the model from the network-based WLAN trust service.

7. The wireless STA of claim 1,
wherein the secure WLAN connection agent module is to determine the initial trust score based upon a comparison of the information to a plurality of security indicators.

8. The wireless STA of claim 7,
wherein the comparison of the information to a plurality of security indicators generates a score for each of the plurality of security indicators and wherein the initial trust score is a weighted sum of the scores.

9. A method comprising:
using a computer processor of a device to perform the operations of:
scanning for an access point;
collecting information on the access point;
determining an initial trust score for the access point based upon the information;
upon connecting to the access point, blocking network access to applications on the device;
establishing a connection with a network-based WLAN trust service;
sending at least the collected information to the network-based WLAN trust service;
receiving a refined trust score from the WLAN trust service; and
responsive to receiving the refined trust score, allowing at least partial network access to the applications running on the device.

10. The method of claim 9, comprising causing the initial trust score to be displayed along with an SSID of the access point in a network picker graphical user interface.

11. The method of claim 10, comprising
responsive to a user selection of the access point in the network picker graphical user interface authenticating and associating with the access point.

12. The method of claim 9, comprising
determining the initial trust score based upon the information and a model built using a machine learning algorithm.

13. A non-transitory machine-readable medium comprising instructions, which when performed by a machine, cause the machine to perform operations of:
scanning for an access point;
collecting information on the access point;
determining an initial trust score for the access point based upon the information;
upon connecting to the access point, blocking network access to applications running on the machine;
establishing a connection with a network-based WLAN trust service;
sending at least the collected information to the network-based WLAN trust service;
receiving a refined trust score from the WLAN trust service; and
responsive to receiving the refined trust score, allowing at least partial network access to the applications running on the machine.

14. The non-transitory machine-readable medium of claim 13, wherein the operations comprise:
causing the initial trust score to be displayed along with an SSID of the access point in a network picker graphical user interface.

15. The non-transitory machine-readable medium of claim 14, wherein the operations comprise:
responsive to a user selection of the access point in the network picker graphical user interface authenticating and associating with the access point.

16. The non-transitory machine-readable medium of claim 13, wherein the operations comprise
determining the initial trust score based upon the information and a model built using a machine learning algorithm.

17. The non-transitory machine-readable medium of claim 16, wherein the machine learning algorithm is a logistic regression algorithm.

18. The non-transitory machine-readable medium of claim 16, wherein the operations comprise
receiving the model from the network-based WLAN trust service.

19. The non-transitory machine-readable medium of claim 13, wherein the operations comprise determining the initial trust score based upon a comparison of the information to a plurality of security indicators.

20. The non-transitory machine-readable medium of claim 18, wherein the comparison of the information to the plurality of security indicators generates a score for each of the plurality of security indicators and wherein the initial trust score is a weighted sum of the scores.

* * * * *